United States Patent
Trandem et al.

(10) Patent No.: US 11,630,204 B2
(45) Date of Patent: Apr. 18, 2023

(54) ACOUSTIC DEVICE AND METHOD FOR AMPLIFYING AND IMPRINTING INFORMATION ON AN INTERROGATING SIGNAL

(71) Applicant: Ocean Space Acoustics AS, Trondheim (NO)

(72) Inventors: Odd Trandem, Trondheim (NO); Tone Berg, Trondheim (NO)

(73) Assignee: Ocean Space Acoustics AS, Trondheim (NO)

( * ) Notice: Subject to any disclaimer, the term of this patent is extended or adjusted under 35 U.S.C. 154(b) by 0 days.

(21) Appl. No.: 17/753,725

(22) PCT Filed: Sep. 9, 2020

(86) PCT No.: PCT/EP2020/075175
§ 371 (c)(1),
(2) Date: Mar. 11, 2022

(87) PCT Pub. No.: WO2021/048191
PCT Pub. Date: Mar. 18, 2021

(65) Prior Publication Data
US 2022/0381904 A1    Dec. 1, 2022

(30) Foreign Application Priority Data
Sep. 13, 2019  (NO) .................................. 20191098

(51) Int. Cl.
*G01S 15/58* (2006.01)
*G01S 15/32* (2006.01)

(52) U.S. Cl.
CPC ............ *G01S 15/584* (2013.01); *G01S 15/32* (2013.01)

(58) Field of Classification Search
CPC ........ G01S 15/584; G01S 15/32; G01S 15/74; H04B 11/00
See application file for complete search history.

(56) References Cited

U.S. PATENT DOCUMENTS 10,948,594 B2 * 3/2021 Berg ....................... G01S 15/74
2017/0329003 A1   11/2017 Hung et al.
(Continued)

FOREIGN PATENT DOCUMENTS

CA    3150366 A1 *  3/2021 ............. G01S 15/32
EP    0681192 A2    11/1995
(Continued)

OTHER PUBLICATIONS

International Search Report issued in International Application No. PCT/EP2020/075175, dated Mar. 4, 2021 (3 pages).
(Continued)

*Primary Examiner* — Daniel Pihulic
(74) *Attorney, Agent, or Firm* — Osha Bergman Watanabe & Burton LLP (57) ABSTRACT

An acoustic transponder provides information related to the transponder when the transponder is receiving an acoustic interrogating signal. The transponder includes a power supply, an electronic circuit connected to the power supply, and one or more transducers receiving and emitting the acoustic signal. The electronic circuit includes a sequence generator. The transponder further includes an amplification and modulation unit, an extraction filter, and a suppression filter. The extraction filter is adapted to extract the received acoustic interrogating signal and suppress other signals prior to being input to the amplification and modulation unit which are (Continued)

configured to modulate the received acoustic signal according to a sequence generated by the sequence generator and to amplify the modulated signal. The suppression filter is adapted to suppress the received acoustic interrogating signal from the amplified and modulated signal. The amplified modulated signal is transferred through the one or more transducers of the transponder and/or through other transducer(s).

26 Claims, 4 Drawing Sheets

(56) References Cited

U.S. PATENT DOCUMENTS

| | | | |
|---|---|---|---|
| 2019/0018135 A1* | 1/2019 | Berg | G01S 1/72 |
| 2022/0381904 A1* | 12/2022 | Trandem | G01S 15/584 |

FOREIGN PATENT DOCUMENTS

| | | | | |
|---|---|---|---|---|
| EP | 1846917 B1 | | 6/2012 | |
| GB | 2602236 A | * | 6/2022 | G01S 15/32 |
| JP | H01197686 A | | 8/1989 | |
| NO | 2017121752 A1 | | 7/2017 | |
| WO | 8501583 A1 | | 4/1985 | |
| WO | WO-2017121752 A1 | * | 7/2017 | G01S 1/72 |
| WO | WO-2021048191 A1 | * | 3/2021 | G01S 15/32 |

OTHER PUBLICATIONS

Written Opinion issued in International Application No. PCT/EP2020/075175; dated Mar. 4, 2021 (7 pages).

International Preliminary Report on Patentability issued in International Application No. PCT/EP2020/075175; dated Jan. 5, 2022 (14 pages).

Search Report issued in Norwegian Application No. 20191098; dated Mar. 6, 2020 (2 pages).

* cited by examiner

ACOUSTIC DEVICE AND METHOD FOR AMPLIFYING AND IMPRINTING INFORMATION ON AN INTERROGATING SIGNAL

TECHNICAL FIELD

The present invention relates to the technical field of acoustics, and more specifically to an acoustic transponder amplifying and imprinting information on an interrogating signal for providing a unique identification and localization of underwater objects connected to the transponder.

BACKGROUND

A transponder is a device that emits or reflects an identifiable signal in response to a received interrogating signal. For underwater acoustic applications, there are two main types of transponders, active and passive transponders.

A traditional active transponder receives an interrogating signal that activates a transmitter sending a signal in response to the interrogating signal. A passive transponder only reflects the interrogating signal, and little information other than distance from interrogating unit can be derived. An example of a passive transponder is described in EP 1 846 917 B1.

There is also a semi-passive transponder, described in WO 2017121752. In this solution, the reflected signal is imprinted with information by changing the acoustic reflection coefficient of the transponder. The term semi-passive relates to the fact that a small battery is present for powering a simple electronic circuit adapted for changing the acoustic reflection coefficient of the transducer. The returned signal is a reflection, but the signal is modified because of the variation in the reflection coefficient. This type of transponder is suited for detection at relatively short distances since the reflected signal is not amplified.

The acoustic transponder according to present invention does not have a full receiving unit searching for an interrogating signal or a full transmitter unit for transmitting a standalone signal as an answer to an interrogating signal.

Instead, the transponder uses the incoming signal directly as a source for the emitted signal. The incoming signal is amplified and imprinted with information before it is emitted back into the water.

The acoustic transponder includes an extraction filter for extracting the incoming interrogating signal from other signals, an amplifier that amplifies the interrogating signal, a modulation circuit that imprints information on the amplified signal, and a suppression filter that suppresses the original interrogating signal while letting the information-imprinted signal pass.

This arrangement has several advantages for identification and localisation applications. On advantage is that there is no need for synchronization to an interrogating signal, since the interrogating signal is passed through with no other delays than those introduced by filters and other analogue components. Accurate distance measurements can thus be performed by measuring delays between the transmitted and the received signal on a central unit transmitting the interrogation signal. There is no need for accurate trigger circuits or clocks inside the transponder itself since the transponder uses the interrogating signal. This means that there is no need for accurate oscillators to generate the acoustic wave centre frequency. Doppler speed estimation, i.e. estimation of velocity along a line from an interrogating unit to a transponder, can thus be made without depending on accuracy of electronic components inside the transponder.

Another advantage is that different types of interrogating signals can be used. One type of interrogating signal can be used for providing the identity of a transponder as well as additional information. This is provided with low probability of bit errors. Another type of interrogating signal can be used for distance estimation with high accuracy. The signal chain and processing performed in the transponder can be the same in both types of interrogating signals.

The main advantage of the invention over the semi-passive transponder is the increased detection range due to amplification of the signal in the transponder.

The transponder according to the invention can be made such that compatibility with said semi-passive transponder is maintained. It can utilize the same type of interrogating signal and can imprint information on the signal in such a way that a receiver in the interrogating unit can use the same algorithms for interpreting signals from a semi-passive transponder as for the transponder according to the invention.

The main advantage of the present invention over the prior art is that the signal strength received at the interrogating unit is stronger, since there is an amplifier in the signal chain from the interrogating transmitter to the interrogating receiver.

The transponder according to the invention is especially useful when an interrogating unit is integrated into a traditional echo sounder or sonar.

The fact that the signal to noise ratio at the transponder input is generally quite good is utilized to make a simple extraction filter unit, and still have good signal quality to imprint information before or after amplification and before sending the signal back to the interrogating unit.

The present invention will provide a good and versatile solution for several underwater applications. Since the emitted acoustic signal from the transponder is amplified and the signal comprises an ID of the transponder, it is well suited to be used for identification of objects over longer distances than the previously described semi-passive transducer. By for instance connecting the inventive transponder to different types of equipment, the ID and the position of the transponder can be found, and thus the equipment it is connected to. One application is identification of lost cargo or fishing gear, which is known to be a global environmental problem.

Another application is to use the invention during fishing, e.g. for providing accurate positions of a trawl door, a long line or a Danish seine. It is well suited for positioning in general, e.g. anchoring equipment, risers, pipes etc.

Yet another application is monitoring underwater systems, like aqua culture nets. It is especially important to be able to continuously monitor the shape of such nets when exposed to heavy wind and currents to prevent escapes. An alarm may for instance be triggered if the shape of a net falls outside a given norm.

In addition to identification and positioning of the transponder, additional information from sensors connected to the transponder can be imprinted into the signal. This provides several applications where availability of sensor data is of interest, with or without providing identification and localisation information at the same time.

SHORT DESCRIPTION OF THE INVENTION

The present invention is set forth and characterized in the main claims, while the dependent claims describe other characteristics of the invention.

The invention is defined by an acoustic transponder providing information related to the transponder when it is receiving a recognizable acoustic interrogating signal. The transponder comprises a power supply, an electronic circuit connected to the power supply and one or more transducers receiving and emitting the acoustic signal.

The electronic circuit comprises a sequence generator and an amplification and modulation unit, were these are configured to modulate the received acoustic signal according to a sequence generated by the sequence generator and to amplify the modulated signal, and to transfer the amplified modulated signal through the one or more transducers of said transponder and/or through another transducer(s).

All said elements of the acoustic transponder are enclosed in a housing which preferably is waterproof.

The transducer receiving the acoustic signal is in one embodiment also used for emitting the amplified and modulated signal. If this is the case, the acoustic transponder comprises only one transducer. In another embodiment, additional transducers are used for emitting the amplified and modulated signal. The additional transducers can be comprised in the housing of the acoustic transponder or they may be included in other external devices.

In one embodiment, the electronic circuit further comprises an extraction filter and a suppression filter. The extraction filter is adapted to extract an acoustic interrogating signal received by the transducer and to supress other signals prior to being input to the amplification and modulation unit. The suppression filter is adapted to supress the received acoustic interrogating signal from the amplified and modulated signal.

In one embodiment, the extraction filter is a band-pass filter adapted to supress signals other than the incoming acoustic interrogating signal.

In one embodiment, the extraction filter is a combination of a high-pass filter and a low-pass filter adapted to supress signals other than the incoming acoustic interrogating signal.

In one embodiment, the suppression filter is a band-stop filter adapted to pass the amplified modulated signal and supress other signals.

In one embodiment, the suppression filter is a combination of a high-pass filter and a low-pass filter adapted to pass the amplified modulated signal and supress other signals.

In one embodiment, the extraction filter and the suppression filter are combined into one filter unit.

In one embodiment, the amplification and modulation unit is connected to a trigger unit adapted to activate the amplification and modulation unit only when the transponder receives an acoustic interrogating signal entering the transponder.

In one embodiment, the amplifier is adapted to only amplify signals above a defined amplitude level.

In one embodiment, the amplification and modulation unit is adapted to imprint the received signal with any type of static and/or dynamic information.

In one embodiment, the acoustic transponder comprises one or more amplifiers in the signal chain.

In one embodiment, the acoustic transponder comprises a directional coupler connected between the extraction filter and the suppression filter in the electronic circuit for connecting the transducer to the extraction filter and the suppression filter.

In one embodiment, the extraction filter, suppression filter and sequence generator are implemented in the electronic circuit as a digital solution comprising an amplifier connected to the transducer and a first anti-aliasing filter connected to a A/D converter that is connected to a digital filtering and modulation unit which is connected to a D/A converter that is connected to a second anti-aliasing filter which is connected to the transducer 40 and the 1st anti-aliasing filter.

The invention is further defined by a method for providing information related to a transponder when it is receiving an acoustic interrogating signal, said transponder comprises a power supply, an electronic circuit connected to the power supply and one or more transducers receiving the acoustic signal. The received acoustic signal is modulated according to a sequence generated by a sequence generator comprised in the electronic circuit and the modulated signal is amplified in an amplification and modulation unit comprised in the electronic circuit before transferring the amplified modulated signal through the one or more transducers of said transponder and/or through another transducer(s).

According to one embodiment, the received acoustic signal is extracted while other signals are supressed, by means of an extraction filter, prior to being input to the amplifier and supressing the received acoustic interrogating signal from the amplified and modulated signal by means of a suppression filter.

According to one embodiment, the same transducer(s) is used for both receiving and emitting signals.

According to one embodiment, different transducer(s) are used for receiving and emitting signals.

According to one embodiment, the modulation is performed by using amplitude modulation with two or more modulator states.

According to one embodiment, the modulation is performed by using phase modulation with two or more modulation states.

According to one embodiment, the modulation is performed by using quadrature amplitude modulation with four or more modulation states.

According to one embodiment, the modulation is performed by changing the amplitude and/or phase of the amplified signal in accordance with information bits entering the modulator.

According to one embodiment, the modulation is performed by using amplitude modulation and letting the amplification and modulation unit enter an active or idle state in accordance with information bits entering the modulator.

According to one embodiment, the modulation is provided by switching the input of the amplification and modulation unit between two or more amplitude and/or phase shifted versions of signal output from the extraction filter.

According to one embodiment, a trigger unit comprised in the electronic circuit activates the amplification and modulation unit when receiving an input signal above a set threshold level for a set minimum of time.

According to one embodiment, a trigger unit comprised in the electronic circuit activates the amplification and modulation unit when receiving an input signal according to a set signal.

According to one embodiment, the set signal is an input signal that is above a set threshold level within a minimum time duration.

According to one embodiment, the set signal is an input signal that is above a set threshold level for a certain percentage of time within a minimum time duration.

According to one embodiment, a locally generated signal is feed to the amplification and modulation unit in addition to or instead of the signal extracted from the transducer(s) comprised in the transponder.

In the following description, numerous specific details are introduced to provide a thorough understanding of embodiments of the claimed transponder and method for providing information related to the transponder. One skilled in the relevant art will however recognize that these embodiments can be practiced without one or more of the specific details, or with other components, systems, etc. In other instances, well-known structures or operations are not shown, or are not described in detail, to avoid obscuring aspects of the disclosed embodiments.

BRIEF DESCRIPTION OF THE DRAWINGS

The following figures are used for explaining the present invention in the following detailed description.

DETAILED DESCRIPTION OF THE INVENTION

The acoustic transponder according to the invention will now be described in detail with reference to the figures.

Figure 1:
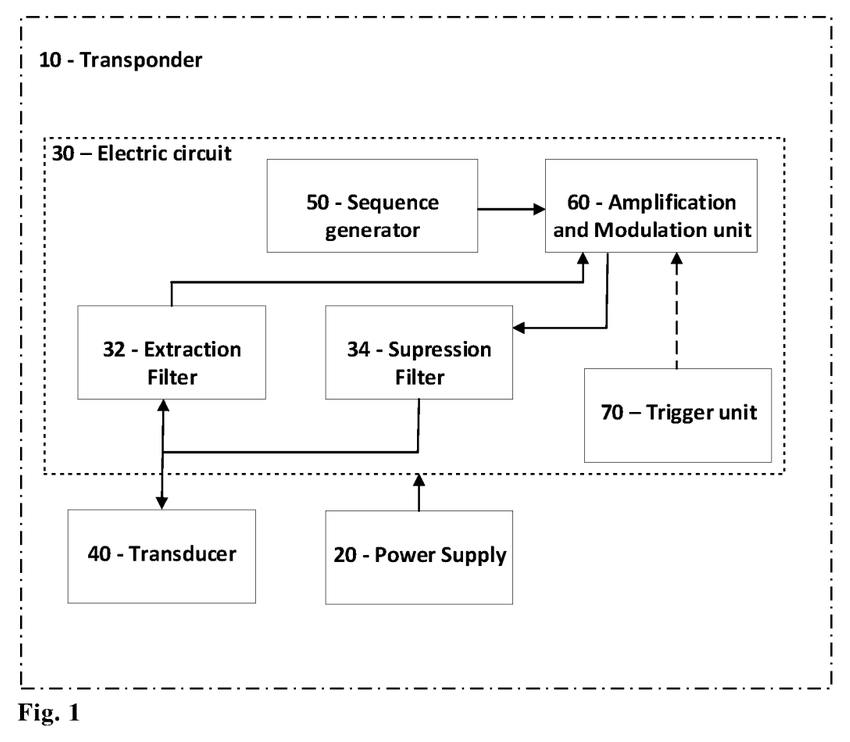
FIG. 1 shows different modules comprised in the acoustic transponder.

FIG. 1 shows an embodiment of the invention comprising different modules comprised in the acoustic transponder 10.

The transponder 10 comprises a power supply 20, an electronic circuit 30 connected to the power supply 20 and one or more transducers 40 receiving the acoustic signal. The electronic circuit 30 comprises at least a sequence generator 50 and an amplification and modulation unit 60.

In the embodiment shown in FIG. 1 the electronic circuit 30 further comprises an extraction filter 32 and a suppression filter 34. The extraction filter 32 acts as an interrogating receiver only passing recognizable signals.

When the acoustic transducer 40 receives acoustic energy, the energy is converted into electric energy. The received acoustic signal from the transducer 40 is fed through the extraction filter 32 before being modulated and amplified by means of the sequence generator 50 and the amplification and modulation unit 60. The modulation performed is according to a sequence generated by the sequence generator 50.

The amplification and modulation unit 60 can be implemented in different ways. One implementation is an amplifier followed by a mixer. The signal from the extraction filter 32 is first amplified before being input to a mixer adding a sequence from the sequence generator 50. Another implementation is to provide a mixer followed by an amplifier. In this configuration a sequence from the sequence generator 50 is added to the signal from the extraction filter 32 before being amplified. In yet another embodiment, amplifiers are provided both before and after a mixer.

Binary phase-shift keying (BPSK) modulation can be provided by inputting a sequence in the mixer while switching between the interrogation signal received from the extraction filer 32 and an inverted version of this signal. Other modulation types are possible, e.g. selecting between different phase shifted versions of the interrogating signal in the mixer.

By providing the amplifier(s) with an enable control, amplitude modulation (AM) of the signal is possible.

Figure 4:
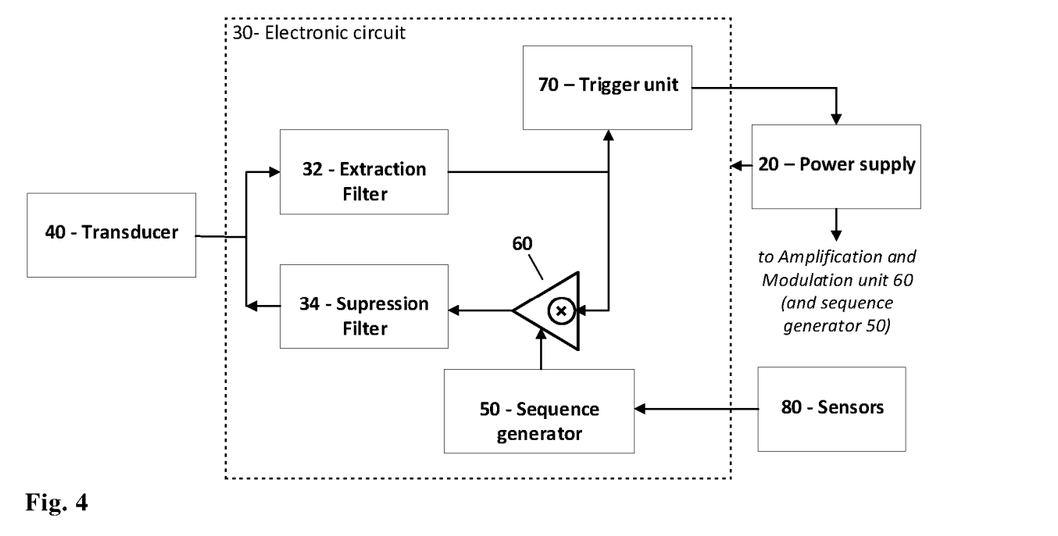
FIG. 4 shows a block diagram of a transponder comprising sensors.

The sequence generator 50 is a logic circuit that feeds the amplification and modulation unit 60 with a bit stream, that is imprinted on the interrogating acoustic signal. The logic may be implemented in a custom logic circuit, a FPGA/CPLD, a microcontroller, or a combination of these technologies. The generated sequence may comprise some known bits, used by the interrogating receiver to search for the signal from the transducer, some predefined or programmed identification bits, and possibly some bits from a sensor (ref. FIG. 4), that will vary dynamically with the sensor data.

The amplified and modulated signal is then transferred via the suppression filter 34 through the one or more transducers 40 of said transponder 10. The amplified and modulated signal may also be fed through a transducer other than the transducer 40 receiving the acoustic signal.

The extraction filter 32 is adapted to extract a received acoustic interrogating signal and to supress other signals prior to being input to the amplification and modulation unit 60. The resulting output from the extraction filter 32 will be the interrogating signal, with possible minor additive noise impairments.

The suppression filter 34 is adapted to pass the signal imprinted with information from the amplification and modulation unit 60, and further to suppress the original interrogating signal. This will avoid a signal loop made by the extraction filter 32 and the amplification and modulation unit 60 with loop gain higher than one, which might lead to self-oscillations. The extraction filter 32 may be a passive filter or a combination of passive and active filters. An active filter section might be combined with the amplifier in the amplification and modulation unit 60.

Figure 2:
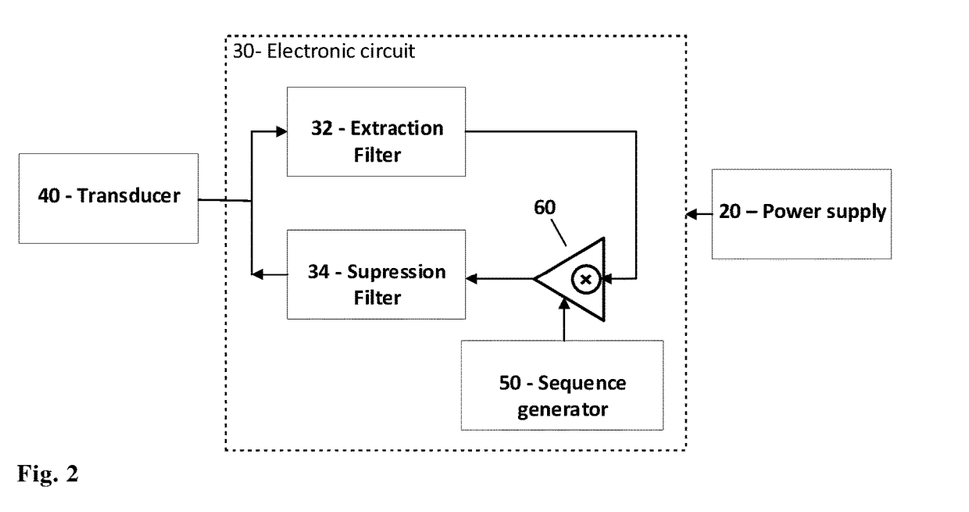
FIG. 2 shows a block diagram of a basic transponder.

FIG. 2 shows a simple block diagram of one embodiment of the acoustic transponder 10 according to the invention. The electronic circuit 30 comprises a sequence generator 50 connected to an amplification and modulation unit 60. Signals from the sequence generator 50 is fed to the amplifier and modulation unit 60. In this way, acoustic signals received by the transducer 40 and extracted by the extraction filter 32 are modulated according to a sequence generated by the sequence generator 50. The modulated signal, which is a signal imprinted with information defined by the sequence, is then sent through a suppression filter 34, that is separating the original interrogating signal by only passing the amplified and modulated signal. The resulting signal is then sent to one or more transducers 40 converting the signal to acoustic energy. In this configuration, a power supply 20 is powering all components comprised in the electronic circuit 30. The transducer(s) 40 used can be the same as the one receiving the original interrogating signal, or other transducer(s).

Figure 3:
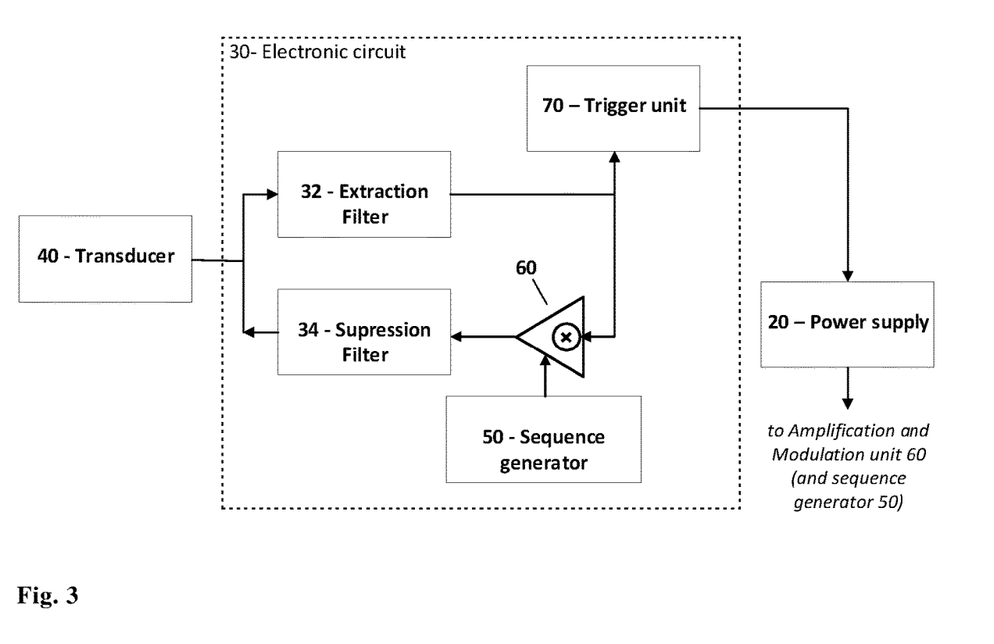
FIG. 3 shows a block diagram of a transponder with a trigger unit for power.

FIG. 3 shows a transponder diagram of another embodiment of the invention. A trigger unit 70 is connected to the power supply 20. In a simple embodiment, a trigger can be a simple rectifier, followed by a low pass filter and a comparator. By adding a trigger unit 70 in the electronic circuit 30, power can be saved by only providing power to the amplification and modulation unit 60 when an interrogating signal is detected.

In one embodiment, the sequence generator 50 is also powered and activated only when an interrogating signal is present. By including a trigger unit 70, the acoustic transponder 10 can be in a sleep mode until woken up, thereby activating all circuits when a specific interrogation signal is detected. In this way, minimal power is drawn when the transponder is inactive.

FIG. 4 shows yet another embodiment of the invention where one or more sensors 80 are included. By connecting sensors 80 to the sequence generator 50, the transponder 10 can convey sensor data, by letting the sequence generator 50 imprint a bit stream of received sensor data into to the interrogating signal that is amplified and modulated before being emitted. Different types of sensors may be used, e.g. sensors for measuring temperature, pressure, salinity etc.

Figure 5:
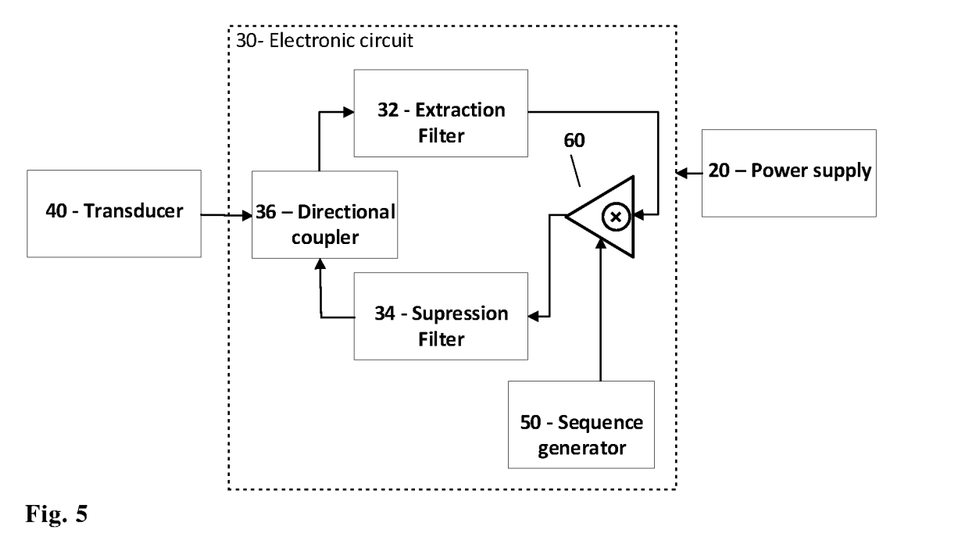
FIG. 5 shows a block diagram of a transponder comprising a directional coupler.

FIG. 5 shows a basic block diagram of an embodiment of the acoustic transponder 10 comprising a directional coupler 36. Instead of wiring the transducer 40, the extraction filter 32 and the suppression filter 34 together, a directional coupler (also called hybrid) can be used to give reduced coupling between the transmitted and the received signal.

Figure 6:
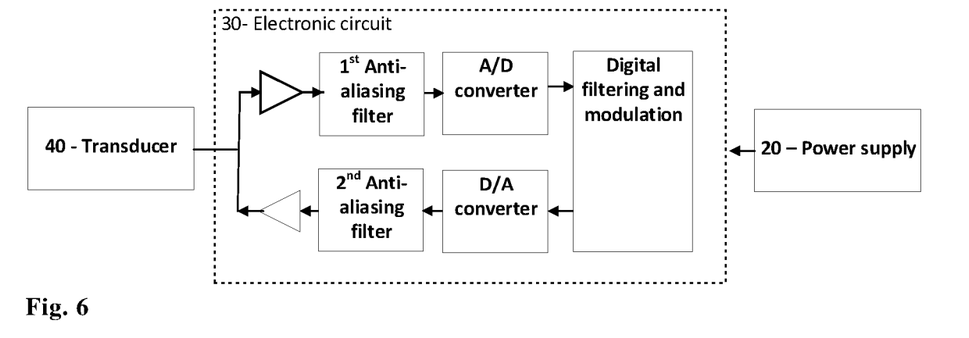
FIG. 6 shows a block diagram of a transponder implemented as a digital solution.

FIG. 6 shows an example of implementation of a digital solution of the acoustic transponder according to the invention.

In this implementation, the extraction filter and the suppression filters as well as the modulator described above can is implemented in the digital domain. In practice, there will be amplifiers and filters before and after A/D and D/A converters. The figure shows anti-aliasing filters before the A/D converter and after the D/A converter. These may be implemented as low-pass filters, or bandpass filters. By using bandpass filters, it is possible to undersample the signal to minimize digital computation load.

The invention claimed is:

1. An acoustic transponder providing information related to the transponder when the transponder is receiving an acoustic interrogating signal, the transponder comprises a power supply, an electronic circuit connected to the power supply, and one or more transducers receiving and emitting the acoustic signal, the electronic circuit comprises a sequence generator, the transponder further comprising:
   an amplification and modulation unit,
   an extraction filter, and
   a suppression filter,
   wherein the extraction filter is adapted to extract the received acoustic interrogating signal and suppress other signals prior to being input to the amplification and modulation unit which are configured to modulate the received acoustic signal according to a sequence generated by the sequence generator and to amplify the modulated signal,
   wherein the suppression filter is adapted to suppress the received acoustic interrogating signal from the amplified and modulated signal, and
   wherein the amplified modulated signal is transferred through the one or more transducers the transponder and/or through other transducer(s).

2. The acoustic transponder according to claim 1, wherein the extraction filter is a hand-pass filter adapted to suppress signals other than the incoming acoustic interrogating signal.

3. The acoustic transponder according to claim 1, wherein the extraction filter is a combination of a. high-pass filter and a low-pass filter adapted to suppress signals other than the incoming acoustic interrogating signal.

4. The acoustic transponder according to claim 1, wherein the suppression filter is a band-stop filter adapted to pass the amplified modulated signal and suppress other signals.

5. The acoustic transponder according to claim 1, wherein the suppression filter is a combination of a high-pass filter and a low-pass filter adapted to pass the amplified modulated signal and suppress other signals.

6. The acoustic transponder according to claim 1, wherein the extraction filter and the suppression filter are combined into one filter unit.

7. The acoustic transponder according to claim 1, wherein the amplification and modulation unit is connected to a trigger unit adapted to activate the amplification and modulation unit only when the transponder receives an acoustic interrogating signal entering the transponder.

8. The acoustic transponder according to claim 1, wherein the amplifier is adapted to only amplify signals above a set amplitude level.

9. The acoustic transponder according to claim 1, wherein the amplification and modulation unit is adapted to imprint the transmitted signal with any type of static and/or dynamic information.

10. The acoustic transponder according to claim 1, comprising one or more amplifiers in the signal chain.

11. The acoustic transponder according to claim 1, comprising a directional coupler connected between the extraction filter and the suppression filter in the electronic circuit for connecting the transducer to the extraction filter and the suppression filter.

12. The acoustic transponder according to claim 1, wherein the extraction filter, suppression filter and the sequence generator are implemented in the electronic circuit as a digital solution comprising an amplifier connected to the transducer and a $1^{st}$ anti-aliasing filter connected to a A/D converter that is connected to a digital filtering and modulation unit which is connected to a D/A converter that is connected to a $2^{nd}$ anti-aliasing filter which is connected to the transducer and the $1^{st}$ anti-aliasing filter.

13. A method for providing information related to a transponder when the transponder is receiving an acoustic interrogating signal, the transponder comprises a power supply, an electronic circuit connected to the power supply and one or more transducers receiving the acoustic signal, the method comprising:
   extracting the received acoustic interrogating signal and suppressing other signals, by means of an extraction filter, prior to being input to an amplification and modulation unit,
   suppressing the received acoustic interrogating signal from the amplified and modulated signal by means of a suppression filter,
   modulating the received acoustic signal according to a sequence generated by a sequence generator comprised in the electronic circuit and amplifying the modulated signal in an amplification and modulation unit comprised in the electronic circuit,
   suppressing the received acoustic interrogating signal from the amplified and modulated signal by means of a suppression filter, and
   transferring the amplified modulated signal through the one or more transducers of the transponder and/or through another transducer(s).

14. The method according to claim 13, by using same transducer(s) for both receiving and transmitting signals.

15. The method according to claim 13, by using different nsducer(s) for receiving and transmitting signals.

16. The method according to claim 13, wherein the modulation is performed by using amplitude modulation with two or more modulator states.

17. The method according to claim 13, wherein the modulation is performed by using phase modulation with two or more modulation states.

18. The method according to claim 13, wherein the modulation is performed by using quadrature amplitude modulation with four or more modulation states.

19. The method according to claim 13, wherein the modulation is performed by changing the amplitude and/or phase of the amplified signal in accordance with information bits entering the modulator.

20. The method according to claim 13, wherein the modulation is performed by using amplitude modulation and letting the amplification and modulation unit enter an active or idle state in accordance with information bits entering the modulator.

21. The method according to claim 13, wherein modulation is provided by switching the input of the amplification and modulation unit between two or more amplitude and/or phase shifted versions of signal output from the extraction filter (32).

22. The method according to claim 13, by letting a trigger unit comprised in the electronic circuit activate the amplification and modulation unit when receiving an input signal above a set threshold level for a set minimum of time.

23. The method according to claim 13, by letting a trigger unit comprised in the electronic circuit activate the amplification and modulation unit when receiving an input signal according to a set signal.

24. The method according to claim 23, by letting the set signal be an input signal that is above a set threshold level within a minimum time duration.

25. The method according to claim 23, by letting the set signal be an input signal that is above a set threshold level for a certain percentage of time within a minimum time duration.

26. The method according to claim 13, by feeding a locally generated signal to the amplification and modulation unit in addition to or instead of the signal extracted from the transducer(s) comprised in the transponder.

* * * * *